United States Patent [19]

Yukitoshi et al.

[11] 4,353,951
[45] Oct. 12, 1982

[54] SPOT-WELDABLE BONDED CLAD METAL PLATE

[75] Inventors: Teruo Yukitoshi, Amagasaki; Takao Hino, Osaka; Yoshinobu Ohya, Amagasaki, all of Japan

[73] Assignees: Daicel Chemical Industries, Ltd.; Sumitomo Metal Industries, Ltd., both of Osaka, Japan

[21] Appl. No.: 269,291

[22] Filed: Jun. 1, 1981

[30] Foreign Application Priority Data

Jun. 4, 1980 [JP] Japan .................................. 55-74387

[51] Int. Cl.$^3$ ............................................. B32B 27/14
[52] U.S. Cl. ..................................... 428/198; 428/206;
428/209; 428/213; 428/215; 428/325; 428/328;
428/402; 428/403; 428/406; 428/457; 428/901
[58] Field of Search ............. 428/213, 214, 215, 323,
428/325, 328, 329, 330, 457, 402, 403, 404, 406,
407, 901, 198, 206, 209, 216

[56] References Cited
U.S. PATENT DOCUMENTS 4,277,530 7/1981 Miller .................................. 428/457
4,313,995 2/1982 Delgadillo ......................... 428/901

Primary Examiner—James J. Bell
Attorney, Agent, or Firm—Blanchard, Flynn, Thiel, Boutell & Tanis

[57] ABSTRACT

There is provided a spot-weldable bonded clad metal plate wherein the metal sheets are 0.05–1.0 mm thick and at least 0.4 mm thick, respectively, the adhesive layer has a thickness of 15–60 microns and the adhesive layer contains 10–100 g/m$^2$ of metallic powder having a particle diameter corresponding to 0.5–1.5 times the thickness of the adhesive layer. The metallic powder is not necessarily entirely metallic and, for example, glass beads having surfaces coated with a metal can also be used. As the adhesive, a polyamide resin adhesive, particularly, a hot melt type polyamide resin adhesive is preferred.

The bonded clad metal plate shows excellent adhesion strength, and in spite of such thin metal sheets, does not blister when spot-welded.

8 Claims, 2 Drawing Figures

SPOT-WELDABLE BONDED CLAD METAL PLATE

This invention relates to spot-weldable bonded clad metal plates.

In recent years, bonded clad metal plates produced by laying a stainless steel sheet upon, for example, an ordinary steel sheet as a base metal sheet and bonding the metal sheets with a resin type adhesive layer sandwiched between them have been widely used in external decoration applications in the field of buildings, bridges, roads or the like. Such steel plates are inexpensive and endure prolonged service without losing their corrosion resistance and beautiful surface luster. However, these bonded clad steel plates can not be seamed by resistance welding because of the presence of a sandwiched adhesive which is an electrical insulator.

Accordingly, in assembling such clad metal plates, seaming methods such as bolt fastening must be used instead of usual methods for binding members, such as spot welding. This requires much labor and much expenditure for construction. Accordingly, the development of spot-weldable adhesively bonded clad steel plates has been desired.

As mentioned above, clad metal plates prepared by bonding with an adhesive are known. For example, in Japanese Patent Publication No. Sho. 51-46788, ethyleneacrylic acid-butyl acrylate terpolymers are disclosed as adhesives for clad metal plates and in Japanese Published Unexamined Patent Application No. Sho. 50-27750, modified propylenes are disclosed.

However, for lack of adhesion between metal sheets, prior bonded clad metal plates have suffered from peel-off of the adhesive layer when the bonded metal clad plates are subjected to forming work such as bending or drawing.

On the other hand, spot-weldable bonded clad metal plates are also known, and Japanese Published Unexamined Patent Applications Nos. Sho. 50-799220 and Sho. 53-128687 disclose that in a bonded clad metal plate, the metal plate can be provided with spot weldability by incorporating metallic powder into the adhesive.

However, these prior patents or applications relate to vibration-damping materials, and accordingly the metal plates are relatively thick (above 0.6 mm) and the adhesive layer is also very thick (0.1–0.2 mm).

When the present inventors et al. tested for weldability, using a bonded clad metal plate prepared by bonding a relatively thin metal sheet (0.3 mm thick) and a relatively thick metal sheet (0.6 mm thick) with an adhesive layer (0.1 mm thick) containing metallic powder having a particle diameter of 30 microns, it was found that blistering occurs in the vicinity of a nugget.

This blistering is considered to be caused by decomposition of the organic adhesive with consequent evolution of gases.

From an economic point of view, the bonded clad metal plates of this invention are required to have the thinnest possible thickness, because expensive metallic materials such as stainless steel, copper, aluminum, titanium and the like are used as the sheets for the bonded clad metal plates.

However, as mentioned above, the thinner the sheets become, the more easily blistering occurs during welding. This gives rise to a problem of degrading the excellent surface properties inherent in stainless steel, copper, aluminum, titanium and the like.

As a result of studies of the present inventors to solve such problem, it has been found that blistering during welding, which has been thought to be unavoidable when organic adhesives are used, can be prevented.

This invention relates to, in a bonded clad metal plate prepared by bonding a metal sheet having a thickness of 0.05–1.0 mm to a metal sheet having a thickness of at least 0.4 mm with an adhesive, a spot-weldable bonded clad metal plate wherein the layer of said adhesive has a thickness of 15–60 microns, and said adhesive layer contains 10–100 g/m$^2$ of metallic powder having a particle diameter (in case the particle is nonspherical, its longest dimension is meant) corresponding to 0.5–1.5 times the thickness of the adhesive layer used.

It is preferable that the metal sheet having a thickness of 0.05 to 1.0 mm be thinner than the metal sheet of at least 0.4 mm thickness.

Furthermore, this invention has the second important feature that in spite of using an extremely thin adhesive layer (15–60 microns), excellent adhesion strength can be obtained by the synergistic action of the adhesive and metallic powder.

Examples of the metal sheet having a thickness of 0.05–1.0 mm which can be used in this invention include sheets of stainless steel, copper, copper alloy, nickel, aluminum, aluminum alloy and titanium.

These metals are very expensive, and therefore from an economic point of view the metal sheet is desired to be as thin as possible.

The thickness of the metal sheet is in the range 0.05–1.0 mm, preferably in the range 0.05–0.5 mm.

Next, as the metal sheet having a thickness of at least 0.4 mm, a carbon steel sheet is chiefly used. As the carbon steel there can be mentioned ordinary steel, high-tension steel and in addition, surface-treated carbon steel. Examples of the surface-treated carbon steel include those plated with zinc, tin or copper.

Where the metals to be bonded are different in kind, it is preferred to employ metals which differ little in linear expansion, for this can decrease camber resulting from cooling after hot-pressing.

The metallic powder which can be used in this invention is any conductive powder such as powder of elements, alloys or mixtures thereof, and examples of the powder include powders of iron, zinc, aluminum, copper or stainless steel.

Although there is no limitation for practical purposes, in view of the penetration of the metallic powder into a nugget (molten zone) during welding, the metallic powder should be powder of the same metal as that of the thinner metal sheet as much as possible.

The metallic powder is not necessarily one made entirely of metal, and for example, glass beads having surfaces coated with a metal can also be used. The shape of the metallic powder is preferred to be spherical, but metallic powder in flake form can also be used.

Although the particle diameter of the metallic powder varies with the thickness of the adhesive layer, it is required that the metallic powder have a diameter corresponding to 0.5–1.5 times the thickness of the adhesive layer used. When a diameter below 0.5 times the thickness of the adhesive layer is used, welding becomes impossible, and when a diameter above 1.5 times the thickness of the adhesive layer is used, the adhesion strength decreases remarkably.

When the metallic powder is not spherical, it is required that the longest diameter of the particle fall in the above range. A mixture of fine particles and coarse particles can also be used, but in this case, it is required that the longest diameter fall in the above range as much as possible.

Although the amount of the metallic powder used varies with the thickness of the adhesive layer or the diameter of the metallic powder, it is required that the amount falls in the range of 10–100 g/m². When an amount below 10 g/m² is used, welding is difficult and adhesion strength decreases. On the contrary, when an amount above 100 g/m² is used, adhesion strength decreases owing to the excessive amount.

As the adhesives which can be used in this invention, there can be mentioned thermoplastic resin adhesives and thermosetting adhesives. Examples of the thermoplastic resin adhesives include vinyl acetate types, acrylic resin types, ethylene-vinyl acetate copolymer types, vinyl chloride-vinyl acetate copolymer types, polyamide types, polyolefin resin types and polyester resin types.

Examples of the thermosetting resins include urea resins, melamine resins, phenolic resins and epoxy resins. Also, rubber type adhesives such as chloroprene types, nitrile rubber types, SBR types and polyurethane types can be used.

With respect to the applicable form of the adhesive, solvent types, pressure-sensitive types, tackifing types, hot melt types and reactive types can be used.

The solvent types include organic solvent types, aqueous solution types and emulsion types, and the hot melt types include film-form adhesives and powder form adhesives.

However, coating type adhesives such as solvent types and emulsion types frequently give rise to a problem of environmental pollution by waste water from the emulsion and a problem of difficulty in obtaining adhesive layers having uniform thickness. Accordingly, it is preferred to use film-form hot melt adhesives, which are free from such an environmental pollution problem, and can provide adhesive layers having extremely uniform thickness.

With respect to the thickness of the adhesive layer, a thickness of 15–60 microns is preferred. When the thickness is below 15 microns, the adhesive strength decreases, and it is very hard to use the plate in practice, whereas when the thickness is above 60 microns, unfavorable, blistering occurs during welding.

As the adhesive which can be used in this invention, a polyamide resin is preferred from a point of adhesion strength. As the polyamide resin, any polyamide resin having a melting point of 80°–160° C. and a relative viscosity ($\eta_{rel}$) of 1.50–2.40, when measured in a 0.5% m-cresol solution is used, and particularly preferably a copolymer having, as an essential component, laurolactam or ω-aminoundecanoic acid is used. Examples of such copolymers include the following nylons: 6/66/12 (Japanese Patent Publication No. Sho. 45-22240), 6/69/12 and 6/610/12 (Japanese Patent Publication No. Sho. 50-29876), 6/612/12 (Japanese Published Unexamined Patent Application No. Sho. 48-39766), 6/66/69/12, 6/66/610/12 and 6/66/612/12 (Japanese Published Unexamined Patent Application No. Sho. 50-35291) and 6/66/11/12 and 6/69/11/12 (Japanese Published Unexamined Patent Application No. Sho. 50-35290).

The melting points are measured on a DSC at a rate of temperature rise of 16° C./minute.

The effects of this invention will be illustrated with reference to examples.

BRIEF DESCRIPTION OF THE DRAWING

In FIGS. 1 and 2, 1 is a stainless steel sheet, 2 is a steel sheet, 3 is an adhesive layer, 4 and 4' are electrodes and 5 is a nugget.

Spot welding is carried out by laying two objects to be welded upon each other (in this case, two bonded clad steel plates), putting electrodes (Cu or Cu alloy) on both sides of the assemblage, pressing the electrodes against the assemblage from both sides, energizing the circuit with an electric current and forming a nugget (molten zone) at the interface between the objects by resistance heating (Joule heat). Therefore, spot welding can not be performed if an electrical insulator is present in the electric circuit (electrode-two plates to be welded-electrode).

in the examples, the following spot welding conditions are used:

welding current: 8000 A
weld time: 12 cycles
pressure: 250 Kg
electrode: single type (diameter 16 mm, R 15 mm).

Figure 2:
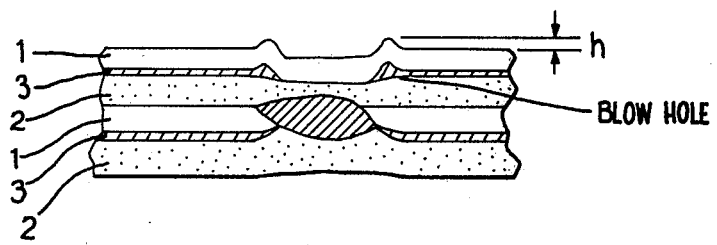
FIG. 2 is a schematic longitudinal sectional view illustrating blistering in the proximity of a nugget.

FIG. 2 is a schematic longitudinal sectional view illustrating blistering in the proximity of the spot-welded zone, examined in the examples of this invention. In FIG. 2, h represents the degree of blistering. For example, when two galvanized steel sheets are spot-welded, the h is 0.05 mm. If this h exceeds 1 mm, the welded sheets can not be put to practical use.

EXAMPLE 1

A stainless steel sheet (SUS 430) having a thickness of 0.30 mm is used as the metal sheet having a thickness of 0.05–1.0 mm, and a galvanized steel sheet having a thickness of 0.5 mm is used as the metal sheet having a thickness of at least 0.4 mm.

As the adhesive, an ionomer resin (Himilan ®1652 manufactured by Mitsui Polychemical Co., Ltd.) is used and as the metallic powder, stainless steel powders having particle diameters of 5, 10, 15, 20, 30, 35, 40, 45 or 75 microns are used. The films shown in Table 1 are prepared by mixing the ionomer with stainless steel powder and extruding the resulting mixture into films.

Next, clad steel plates are prepared by bonding the stainless steel sheet to the galvanized steel sheet with a hot melt adhesive at 180° C. and 5 Kg/cm² for 10 minutes using a two-sided heating press.

Figure 1:
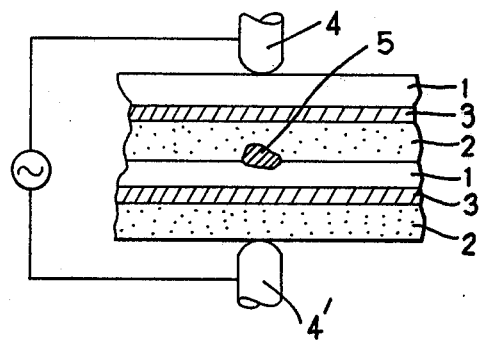
FIG. 1 is a longitudinal sectional view schematically illustrating the arrangement for spot welding in the Examples.

These bonded clad steel sheets are subjected to a test for adhesion strength and a spot welding test as illustrated in FIG. 1. After spot welding, the degree of blistering as illustrated in FIG. 2 is also examined. These results are set forth together in Table 1.

TABLE 1

| film No. | film thickness ($\mu$) | stainless steel powder particle diameter ($\mu$) | stainless steel powder content (g/m²) | adhesion strength (kg/25mm) | spot welding | blistering |
| --- | --- | --- | --- | --- | --- | --- |
| 1 | 10 | — | 0 | 4.0 | X | — |
| 2 | 10 | 5 | 10 | 4.6 | Δ | O |
| 3 | 10 | 5 | 30 | 4.9 | O | O |
| 4 | 15 | — | 0 | 5.8 | X | — |

TABLE 1-continued

| film No. | film thickness (μ) | stainless steel powder particle diameter (μ) | content (g/m²) | adhesion strength (kg/25mm) | spot welding | blistering |
|---|---|---|---|---|---|---|
| 5 | 15 | 5 | 10 | 6.5 | X | — |
| 6 | 15 | 5 | 30 | 7.4 | X | — |
| 7 | 15 | 15 | 5 | 6.0 | X | — |
| 8 | 15 | 15 | 10 | 6.7 | Δ | O |
| 9 | 15 | 15 | 30 | 7.4 | O | O |
| 10 | 15 | 15 | 50 | 6.6 | O | O |
| 11 | 15 | 25 | 10 | 5.5 | O | O |
| 12 | 15 | 25 | 30 | 3.9 | O | O |
| 13 | 25 | — | 0 | 7.1 | X | — |
| 14 | 25 | 10 | 10 | 7.0 | X | — |
| 15 | 25 | 10 | 30 | 7.2 | X | — |
| 16 | 25 | 20 | 10 | 7.4 | Δ | O |
| 17 | 25 | 20 | 30 | 7.8 | O | O |
| 18 | 25 | 30 | 5 | 7.2 | X | — |
| 19 | 25 | 30 | 10 | 7.5 | O | O |
| 20 | 25 | 30 | 30 | 7.7 | O | O |
| 21 | 25 | 30 | 50 | 7.0 | O | O |
| 22 | 25 | 30 | 120 | 4.6 | O | O |
| 23 | 25 | 40 | 10 | 5.5 | Δ | O |
| 24 | 25 | 40 | 30 | 4.0 | O | O |
| 25 | 40 | — | 0 | 7.9 | X | — |
| 26 | 40 | 15 | 10 | 7.9 | X | — |
| 27 | 40 | 15 | 30 | 8.2 | X | — |
| 28 | 40 | 35 | 5 | 8.0 | X | — |
| 29 | 40 | 35 | 10 | 8.4 | Δ | O |
| 30 | 40 | 35 | 30 | 8.8 | O | O |
| 31 | 40 | 35 | 50 | 7.7 | O | O |
| 32 | 40 | 35 | 120 | 4.7 | O | O |
| 33 | 40 | 45 | 5 | 8.0 | X | — |
| 34 | 40 | 45 | 10 | 8.2 | O | O |
| 35 | 40 | 45 | 30 | 8.2 | O | O |
| 36 | 40 | 45 | 50 | 7.8 | O | O |
| 37 | 40 | 45 | 120 | 4.1 | O | O |
| 38 | 40 | 70 | 10 | 7.0 | Δ | X |
| 39 | 40 | 70 | 30 | 5.4 | O | O |
| 40 | 40 | 70 | 50 | 3.9 | O | O |
| 41 | 70 | 70 | 10 | 8.4 | X | — |
| 42 | 70 | 70 | 50 | 7.1 | O | X |
| 43 | 70 | 70 | 120 | 5.0 | O | X |

Notes:
(1) Spot weldability is evaluated by spot-welding bonded clad steel plates at 10 randomly selected points. In this evaluation, the symbols have the following meanings:
X : at least three points out of ten left unwelded.
Δ : one or two points out of 10 left unwelded.
O : all points welded.
(2) Blistering is evaluated in terms of h in FIG. 2.
X : h is equal to or greater than 0.1 mm.
O : h is smaller than 0.1 mm.
(3) Determination of adhesive strength is conducted according to ASTM D 1876-69.
(4) The content of stainless steel powder is an amount per square meter of adhesive film.

In Table 1, bonded clad steel plates of film Nos. 1–7, 11–15, 18, 22–28, 32, 33 and 37–43 are controls, and bonded clad steel plates of film Nos. 8–10, 16, 17, 19–21, 29–31 and 34–36 are examples of this invention.

Bonded clad steel plates of film Nos. 1–3, wherein adhesive films have a thickness of about 10 microns, are spot-weldable on account of the presence of stainless steel powder having a proper particle diameter, and do not blister in the proximity of the weld zone. However, because of lack of adhesion strength and workability, these plates are difficult to put to practical use.

On the other hand, bonded clad steel plates of film Nos. 41–43, wherein adhesive films have a thickness of 70 microns, show high adhesion strength and good workability, and when they contain stainless steel powder having a proper particle diameter, can be spot-welded. However, these plates are difficult to put to practical use because blistering occurs in the proximity of the nugget. Bonded clad steel plates of film Nos. 8–10, 16, 17, 19–21, 29–31 and 34–36, which are examples of this invention, wherein adhesive films have a thickness of 15–60 microns, the metallic powder has a diameter corresponding to 0.5–1.5 times the thickness of the adhesive film, and the metallic powder is contained in an amount of 10–100 g/m²-film, show high adhesion strength, good workability and spot weldability, and no blister occurs in the proximity of the nugget. Bonded clad steel plates of film Nos. 5, 6, 11–12, 14–15, 23, 24, 26, 27 and 38–40, wherein the adhesive films have a thickness of 15–60 microns, but the stainless steel powder has a particle diameter which is below 0.5 time or above 1.5 times the thickness of the adhesive film, are either not spot-weldable, or even if spot-weldable, they either blister or lack workability because of low adhesion strength. Either way, they are difficult to put to practical use. Bonded clad steel plates of film Nos. 7, 18, 22, 28, 32, 33 and 37, wherein the thickness of adhesive films is 15–60 microns, and the stainless powder has a diameter corresponding to 0.5–1.5 times the thickness of the adhesive film, but the adhesive films contain the stainless steel powder in an amount of 5 g/m² or 120 g/m², are either not spot-weldable, or even if spot-weldable, they lack workability because of markedly decreased adhesion strength.

EXAMPLE 2

In the same manner as in EXAMPLE 1, films are prepared by using as a polyamide resin, a nylon 6/612/12 (30/30/40 wt %) copolymer resin, melting point 115° C., relative viscosity 1.70. Next, bonded clad steel plates are prepared by using these films. Table 2 shows formulations of the films used in bonding, adhesion strength, spot weldability and degree of blistering.

TABLE 2

| film No. | film thickness (μ) | stainless steel powder particle diameter (μ) | content (g/m²) | adhesion strength (kg/25mm) | spot welding | blistering |
|---|---|---|---|---|---|---|
| 44 | 20 | 5 | 10 | 7.7 | X | — |
| 45 | 20 | 5 | 30 | 8.4 | O | X |
| 46 | 20 | 20 | 10 | 8.7 | O | O |
| 47 | 20 | 20 | 30 | 8.7 | O | O |
| 48 | 20 | 40 | 10 | 5.4 | X | — |
| 49 | 20 | 40 | 30 | 4.6 | O | O |
| 50 | 30 | 10 | 10 | 10.7 | X | — |
| 51 | 30 | 10 | 30 | 9.1 | Δ | X |
| 52 | 30 | 30 | 5 | 11.4 | X | — |
| 53 | 30 | 30 | 10 | 12.1 | O | O |
| 54 | 30 | 30 | 30 | 12.9 | O | O |
| 55 | 30 | 30 | 120 | 4.2 | O | O |
| 56 | 40 | 15 | 10 | 10.5 | X | — |
| 57 | 40 | 15 | 30 | 14.0 | Δ | X |
| 58 | 40 | 45 | 5 | 14.2 | X | — |
| 59 | 40 | 45 | 10 | 14.7 | O | O |
| 60 | 40 | 45 | 30 | 15.6 | O | O |
| 61 | 40 | 45 | 120 | 4.9 | O | O |
| 62 | 40 | 70 | 10 | 10.9 | X | — |
| 63 | 40 | 70 | 30 | 4.7 | O | O |
| 64 | 70 | 45 | 30 | 16.9 | O | X |
| 65 | 70 | 55 | 30 | 16.4 | O | X |

In Table 2, bonded clad steel plates of film Nos. 44, 45, 48–52, 55–58 and 61–65 are controls, and bonded clad steel plates of film Nos. 46, 47, 53–54, 59 and 60, are examples of this invention. Bonded clad steel plates of film Nos. 64 and 65, wherein the adhesive films have a thickness of 70 microns, show high adhesion strength and good spot weldability, but unfavorably, undergo blistering. Bonded clad steel plates of film Nos. 44, 45, 48, 49, 50, 51, 56, 57, 62 and 63, wherein the adhesive films have a thickness of 20, 30 or 40 microns, and the stainless steel powder has a diameter which is below 0.5 time or above 1.5 times the thickness of the adhesive film, are not weldable or undergo blistering. In any case, these clad steel plates are difficult to put to practical use. Bonded clad steel plates of film Nos. 46, 47, 53–54, 59 and 60, wherein the thickness of the adhesive films is 20, 30 or 40 microns, the stainless steel powder has a particle diameter corresponding to 0.5–1.5 times the thickness of each film, and the contents of the stainless steel powder are 10–100 g/m$^2$-film, show high adhesion strength and good spot weldability, and do not blister in the proximity of the weld zone. On the contrary, bonded clad steel plates of film Nos. 52, 55, 58 and 61, wherein the thickness of the adhesive film is 20, 30 or 40 microns, the stainless steel powder has a particle diameter corresponding to 0.5–1.5 times the thickness of each film, but the contents of the stainless steel powder is 5 g/m$^2$-film or 120 g/m$^2$-film, are not spot-weldable or suffer from markedly decreased adhesion strength.

From EXAMPLES 1 and 2 described above, it can be seen that the bonded clad steel plates according to this invention, that is, the bonded clad steel plates wherein the adhesive layers have a thickness of 15–60 microns and the adhesive layers contain 10–100 g/m$^2$-film of metallic powder having a particle diameter corresponding to 0.5–1.5 times the thickness of the adhesive layer, show good adhesion strength and spot weldability, and do not undergo blistering.

What is claimed is:

1. A laminated plate-form article capable of being welded to a like article, comprising:
   a first, electrically conductive, metal sheet having a thickness of from 0.05 to 1.0 mm;
   a second, electrically conductive, metal sheet having a thickness of at least 0.4 mm, said first and second sheets having mutually opposing surfaces;
   an electrically conductive adhesive layer disposed between and bonded to said opposing surfaces of said sheets, said adhesive layer having a thickness of from 15 to 60 microns, said adhesive layer comprising a mixture of an adhesive and electrically conductive particles, said adhesive layer containing from 10 to 100 g/m$^2$ of said electrically conductive particles, said electrically conductive particles having a particle size in the range of from 0.5 to 1.5 times the thickness of said adhesive layer.

2. A laminated article as claimed in claim 1, wherein said first metal sheet is made of metal selected from the group consisting of stainless steel, copper, copper alloy, nickel, aluminum, aluminum alloy and titanium, and said second metal sheet is made of steel or steel plated with zinc, tin or copper.

3. A laminated article according to claim 2, wherein said electrically conductive particles are substantially spherical particles made of a material selected from the group consisting of iron, zinc, aluminum, copper, stainless steel, alloys thereof, mixtures thereof, and glass beads surface coated with an electrically conductive metal.

4. A laminated article as claimed in claim 1 or claim 3, wherein said adhesive is selected from the group consisting of vinyl acetate resin adhesive, acrylic resin adhesive, ethylene-vinyl acetate copolymer resin adhesive, vinyl chloride-vinyl acetate copolymer resin adhesive, polyamide resin adhesive, polyolefin resin adhesive, polyester resin adhesive, urea resin adhesive, melamine resin adhesive, phenolic resin adhesive, epoxy resin adhesive, chloroprene resin adhesive, nitrile rubber resin adhesive, SBR resin adhesive, and polyurethane resin adhesive.

5. A laminated article as claimed in claim 1, wherein said adhesive is a film-forming hot melt adhesive.

6. A laminated article as claimed in claim 1, wherein said adhesive is a polyamide resin adhesive having a melting point of 80°–160° C. and a relative viscosity of 1.5–2.4 when measured in a 0.5% m-cresol solution, said polyamide resin adhesive being a copolymer having units of laurolactam or omega-aminoundecanoic acid.

7. A laminated article as claimed in claim 1, wherein said first metal sheet is stainless steel, said second metal sheet is galvanized steel, said electrically conductive particles are stainless steel, and said adhesive is polyamide adhesive.

8. A spot-welded assembly comprising two laminates as claimed in claim 1 having said first metal sheet of one of said laminates spot-welded to said second metal sheet of the other of said laminates.

* * * * *